March 26, 1968 — M. KEROPIAN — 3,374,675
ISOMETRIC MUSCLE TESTING APPARATUS
Filed Jan. 4, 1965 — 6 Sheets-Sheet 1

INVENTOR.
MICHAEL KEROPIAN
BY
*Wm. L. Graham*
ATTORNEY

March 26, 1968  M. KEROPIAN  3,374,675
ISOMETRIC MUSCLE TESTING APPARATUS
Filed Jan. 4, 1965  6 Sheets-Sheet 4

INVENTOR.
MICHAEL KEROPIAN
BY
ATTORNEY

March 26, 1968      M. KEROPIAN      3,374,675

ISOMETRIC MUSCLE TESTING APPARATUS

Filed Jan. 4, 1965      6 Sheets-Sheet 5

INVENTOR.
MICHAEL KEROPIAN
BY
ATTORNEY

United States Patent Office 3,374,675
Patented Mar. 26, 1968

3,374,675
ISOMETRIC MUSCLE TESTING APPARATUS
Michael Keropian, 683 7th Ave.,
San Francisco, Calif. 94118
Filed Jan. 4, 1965, Ser. No. 423,082
8 Claims. (Cl. 73—379)

This invention relates to ergometer devices or isometric muscle testing apparatus and more particularly to such devices in which muscular strength of physical movement may be tested between an initial joint of movement of a body member and the extremity or at least another spaced portion of the body member, the muscles of which are being tested. Such testing in the human body is sometimes referred to as isometric muscle testing, and two examples of its most general use are in testing muscles in practice of physical therapy, and in physical exercising procedures.

It is becoming increasingly important in physical therapy to be able to evaluate the muscular condition of a subject-patient and to judge his progress and the effectiveness of his treatment. Therefore, suitable improved apparatus for general isometric testing of various members of anatomy at various positions of posture of the subject can greatly assist in patient evaluation as isometric force may be accurately measured and recorded by the examiner, operator, or physical therapist, to obtain a more exact picture of the status of muscle development, strength and reaction. The field of need for such an apparatus will become increasingly apparent as the need for physical restoration of patients or subjects grows in importance.

One object of the invention is to provide a muscle testing apparatus adapted for testing either strength or amplitude of movement of muscles of various parts of the human body.

Another object is to provide an ergometer appliance selectively positionable at various parts and positions of patients or subjects by use of a single table or support for the patient or subject.

A further object is to provide apparatus interchangeable and adjustable to the various positions and parts of body members which are to be tested.

A further object is to provide a muscle testing apparatus in which the angular position of a tested member may be recorded by a calibrated hinged brake having means for locking at a selective position at which it is desired to position a member of anatomy being tested.

A still further object is to provide in an ergometer apparatus, pressure responsive load cell assembly and adapter devices interchangeable for testing the various body members and effecting registration on an indicator gauge of the amount of pressure exerted by movement of a muscular complex.

Another object is to provide in muscle testing devices an adapter means to engage a particular part of human anatomy in operative spaced relation of a lockable hinge brake and provide in combination with such adapter an interchangeable hydraulic pressure-responsive means for visibly indicating a pressure on a visible gauge.

A further object is to provide specialized adapter means for engaging various parts of the body in testing and having interchangeable releasable fastening means for engagement with a pressure-operated load cell.

With the foregoing and other objects in view as will more fully appear from the descriptive specification herein, preferred forms in which the invention may be exemplified are described herein and illustrated in the accompanying drawings, in which.

Referring to the drawings in which like reference characters indicate corresponding parts in the several views, functions in modified forms are designated by a sublettter.

Referring firstly to FIGS. 1 to 9 of the drawing, there is provided a suitable support for a subject or patient to be tested and for support of the testing apparatus of the invention, said support being herein exemplified as an elongated table 20 having a planar top 21 supported at a suitable operating height convenient for the operator, as by legs 22, and if desired, the table may have storage cabinets 23 under the top. The planar dimensional size of the table top is selective within reasonable operative limits to accommodate a person in full-length posture thereon, making allowance for persons of unusual height, suggested suitable dimensions being seven feet by three feet.

The table top has depending support runners 24 thereunder adjacently spaced inwardly from the longitudinal side edges and also extending transversely of its head end, attention being here invited to a difference in structure of the transverse runner means 24b at the foot side end of the table, as will be further described. Along each of these runner supports 24, which if desired may be mounted at both opposite longitudinal sides of the table and at the head end of the table, there is a guide rail or track indicated 25 longitudinally of the table and 26 at the head end of the table, and being spaced outwardly from the table runner by web 27, whereby a slide-block generally indicated 28 may slidably engage the head of the rail closely, adjacent to the table top.

The slide-block 28 has at its inner face adjacent the table and integral shoe portion 29 which slidably fits around the head of rail 25 so as to slide therealong and be supported thereby, the slide-block 28 being lockable at selective adjustable stationary position with relation to the longitudinal side of the table and rail 25 by means of a slide bolt 30 sufficiently movable by pressure of the beveled-end surface 31 of a threaded wedge bolt 32, to releasably lock the slide-block against movement along the rail 25.

At its outer end portion removed from the table the slide-block 28 has a cylindrical bore 33 therethrough, the axis of which would be perpendicular to the plane of the table top. Within this bore 33 is rotatably mounted a cylindrical tubular bearing sleeve 34, which may have an integral flanged collar 35 at its upper end, and having its lower end secured within the bore by a removable retaining collar 36 which may be pinned to the cylindrical sleeve wall at 37.

Figures 2, 3:
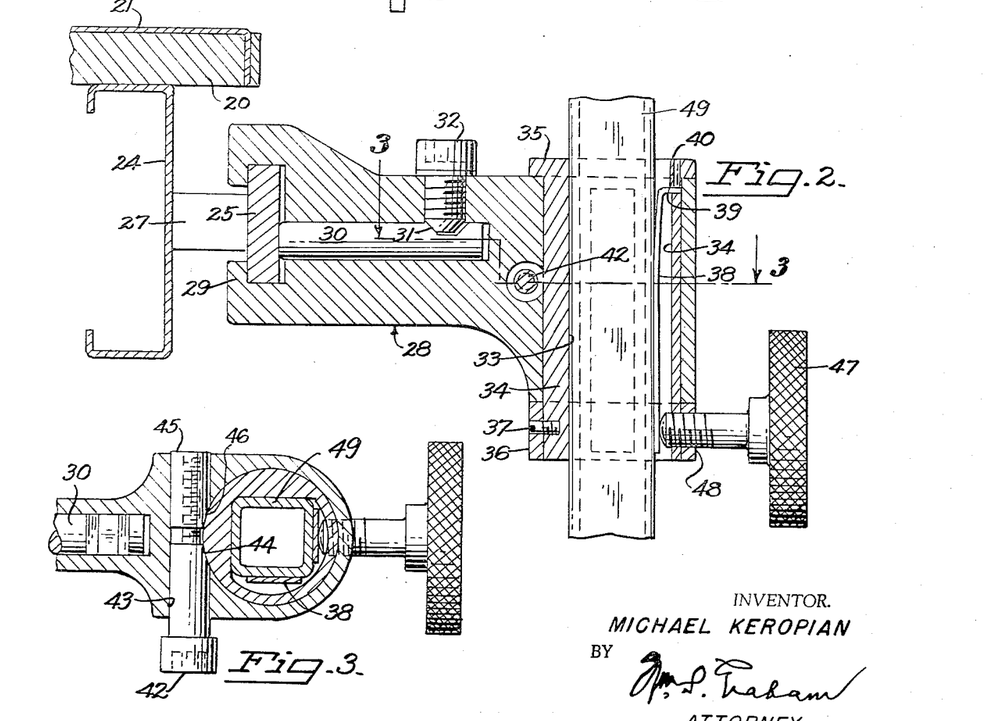
FIG. 2 is an enlarged vertical section of a slide block shown in FIG. 1.
FIG. 3 is a fragmentary lateral transverse section on line 3—3 of FIG. 2.

Disposed longitudinally within the tube of cylindrical bore 33, there are planar elongated friction spring strips 38 sufficiently bowed to give them a degree of resilience intermediate their ends, as best shown in FIG. 2. These friction strips may be suitably secured in place by means of a flange 39 thereon engaged by a set screw 40 at an upper end of the tubular bore 33. The rotation of the cylindrical tubular sleeve 34 in bore 33 may be regulated and braked by a transverse wrench-operated clamp screw 42 mounted in a lateral transverse bore 43 through the slide-block member 28 adjacent to the vertical bore 33 so that one side of the lateral bore 43 intersects a side wall of the vertical bore as at 44, whereby the shank of the clamp screw 42, cooperating with an elongated nut portion 45 which is mounted at the opposite end of bore 43, may be drawn up to exert pressure contact on the elongated side wall of the cylindrical sleeve member 34 as at 46 and thereby anchor the tubular sleeve member 34 against rotation.

Mounted slidably through the cylindrical sleeve member 34 is a vertical support bar or rod 49 which may have a transverse section squarely rectangular in shape, the support rod being held resistently slidable in sleeve 34 by the friction strips 38, but also lockable to a stationary vertically adjustable position by hand wheel clamp 47 threaded through the retaining collar 36 as at 48, it being here noted that the hand clamp 47 has its clamping end in pressure contact with the resilient strip 38 rather than against rod 49, in order to eliminate scarring the face of the rod.

As thus mounted this support bar or rod 49 is held selectively vertically adjustable by clamp 47 and is rotatable on its axis by rotation of the sleeve cylinder 34, subject to control by clamp 42, and is selectively slidable along the table subject to control by clamp bolt 30. The support rod 49 is of a length sufficient so that it may extend adjustably above the table top 21. Fixedly mounted at the upper free end of support rod 49 is a tubular T-member casing 50 which also has a rotatable cylindrical tubular sleeve bearing 51 therein generally similar to the rotatable sleeve member 34 previously described, the tube through the sleeve having spring friction plates similar in structure and purpose to spring strip plates 38 previously described. A pair of manually operated hand clamp screws 52, 53 may likewise be employed in this T-member 50, such hand clamp screws being structurally similar and operating in the same manner as in the rotatable sleeve 34 to control respective longitudinal and rotational movements of an elongated positioning rod or bar 54.

One end portion of the positioning bar 54 may extend through the rotatable tubular sleeve 51, being preferably rectangular in lateral section, and being restrained from unintended casual sliding movement by resilient friction spring strips therein which are similar to the friction strip plates 38 heretofore described.

This positioning bar 54 has mounted at its opposite end a lockable hinge brake generally indicated 55, the structure of which will be more fully described. It should be here noted that the positioning bar 54 is to position the hinge brake at the proper position relative to a joint of the anatomy from which muscles are to be tested. It may be also noted that of the patient is at a suitable position on the supporting table, the supporting rod 49 may be eliminated and the positioning bar 54 and the brake 55 mounted directly in the tube of rotatable sleeve cylinder member 34 of slide-block 28 at the side of the table.

The hinge brake 55 has a pivotal axis hereinafter designated 130, which, in operation, is aligned with the pivotal axis of a specified joint of the anatomy member the muscles of which are being tested.

Figure 1:
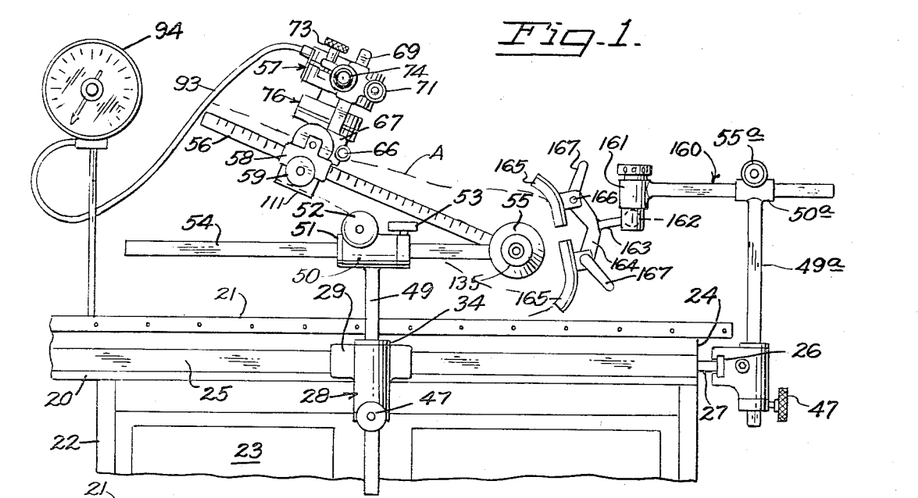
FIG. 1 is a side elevation of the invention mounted on a table support which is shown fragmentarily, a figure of a subject or patient being shown in dotted lines.

The brake 55 provides a lockable hinge or pivot joint between the positioning bar 54 and a calibrated measuring arm 56 which is preferably rectangular in lateral section, the calibrations thereon being preferably in inches and being useful to the therapist or operator in determining the length of leverage of the tested muscles, measured along the member of the anatomy being tested. Since the hinge brake 55 may be locked against pivotal or rotational movement on its axis, it is also a function of the brake to lock the measuring arm 56 to an angle at which it is desired to test muscles of a member, since in operation the measuring arm 56 is preferably positioned substantially parallel with the center line of a tested member of the anatomy, indicated A in broken lines, as shown in FIG. 1.

Figures 6, 7, 12:
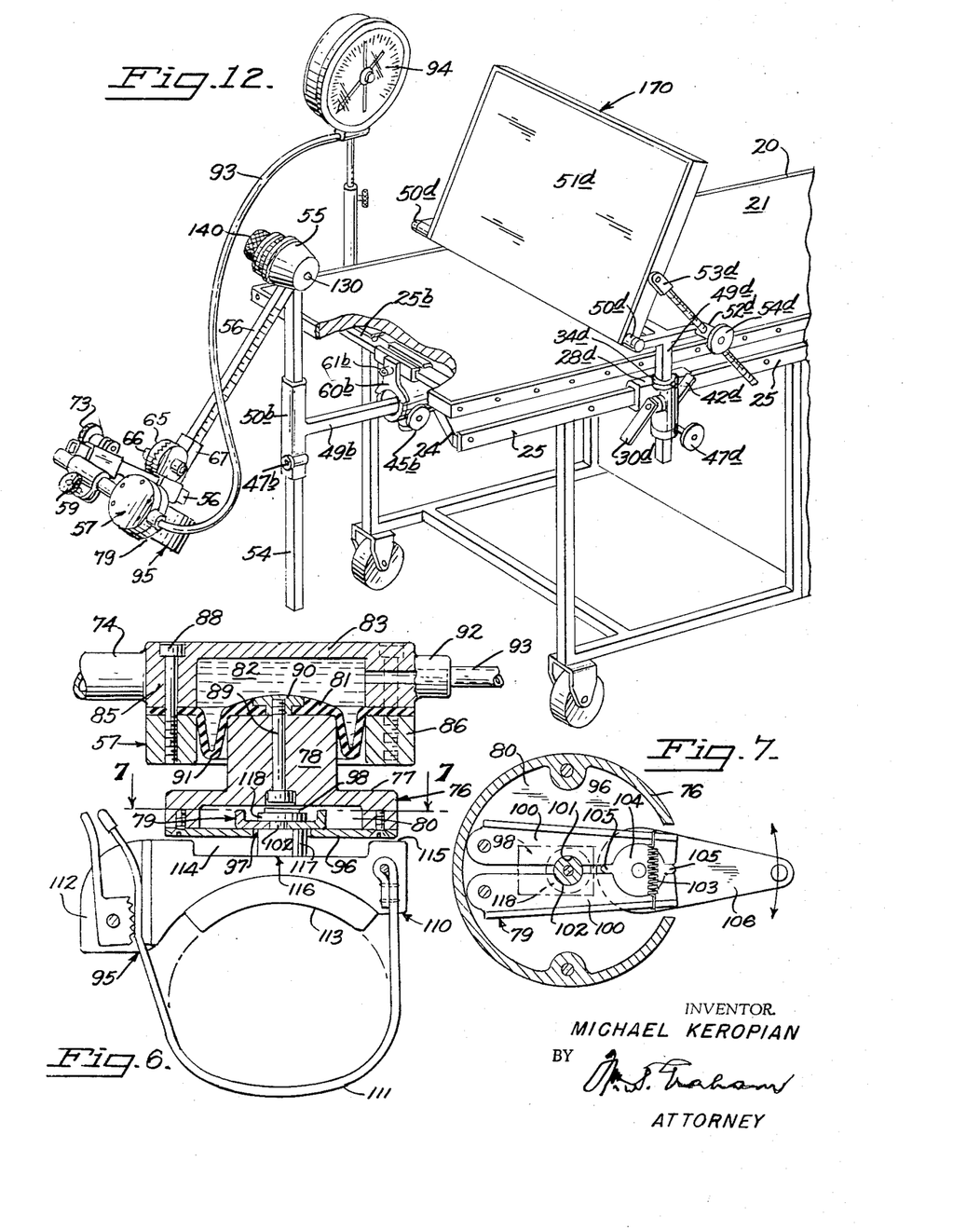
FIG. 6 is an enlarged vertical section of load cell and adapter members, with fastening means therebetween.
FIG. 7 is a detailed sectional plan view of fastening means incorporated in the structure shown in FIG. 6.
FIG. 12 is a perspective view of a modified form of the invention including a back support, a portion of table top being broken away.
Figure 16:
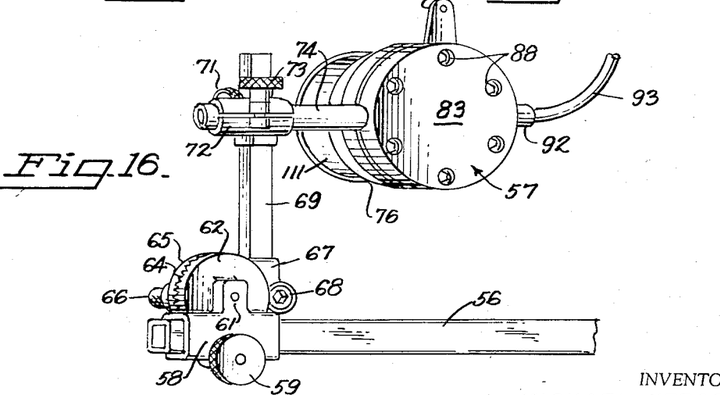
FIG. 16 is a diagrammatic perspective view in which the parts are more or less arbitrarily shown as illustrative.

Along this calibrated measuring arm 56 in spaced relation to brake 55 is mounted a hydraulic pressure diaphragm assembly generally indicated 57, commonly referred to as a load cell, shown in greater detail in FIGS. 6 and 16, and to be further described. The load cell assembly 57 is slidably adjustable along the measuring arm 56 to various selective positions to suit the needs of the individual member of anatomy being tested, but when thus adjusted, the load cell is stationarily clamped to the measuring arm. If desired, differing lengths of measuring arm 56 may be employed, as for example, in the testing of the muscles between the elbow and wrist a shorter length would be required as compared with a test between the hip and ankle, requiring a longer length. For this reason the load cell assembly 57 is mounted adjustable longitudinally along the measuring arm 56, as by a suitable slidable split sleeve 58 which may be clamped stationarily at a selected adjustable position along the length of measuring arm 56 by hand clamp screw 59, best shown in FIGS. 8 and 9.

It should be here noted, however, that universality of positioning of the load cell assembly relative to a tested muscle complex is highly desirable, and therefore the load cell assembly 57 is preferably not mounted directly to the measuring arm 56 which is fixed at a predetermined angle against movement by the locking of brake 55 during a muscle-testing operation.

Figure 8:
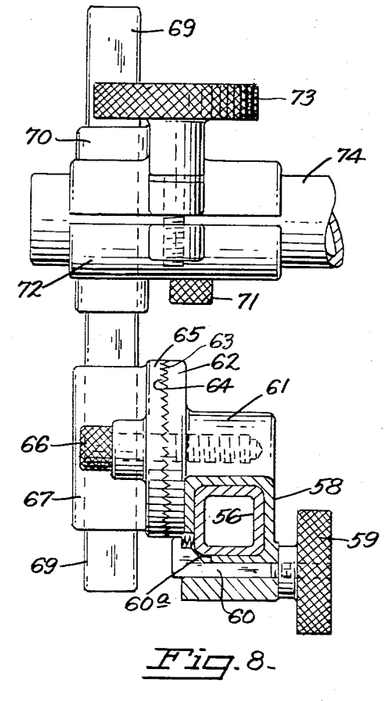
FIG. 8 is an enlarged fragmentary plan view of a mounting means for the load cell and adapter members.
Figure 9:
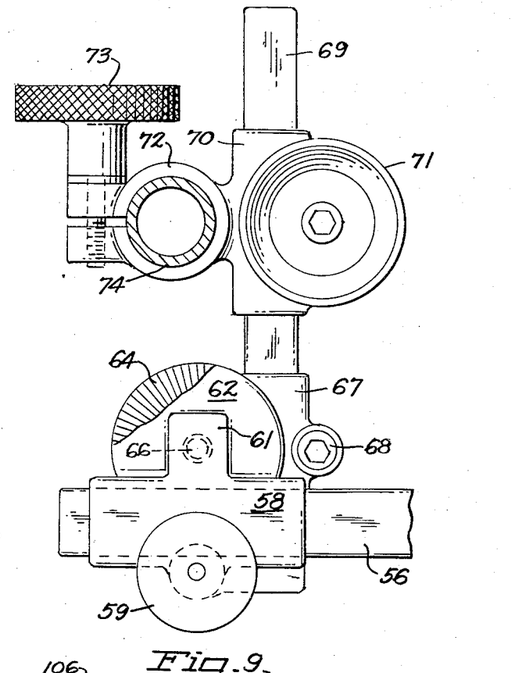
FIG. 9 is a side elevation of FIG. 8.

In a preferred structure for mounting the load cell assembly 57 to the measuring arm 56, as shown best in FIGS. 8 and 9, the hand clamp screw 59 draws-up on the threads at one end of a clamping bolt 60 which passes through split sleeve 58, the bolt having a bevel 60a at its opposite end which impinges on the edges of the split in the sleeve 58 whereby it may either loosely or tightly draw those edges together to selectively loosen or tighten the sleeve on the measuring arm 56.

This split sleeve member 58 is provided with an outwardly extended flange or lug 61 to which is fixedly connected one face of a circular plate 62 having at its opposite planar face radial grooves 63 which are adapted for selective interlocking with complemental grooves 64 of opposing plate 65 by means of an axial clamping bolt 66 by which the plates and their interengageable grooves may be either relatively rotated or alternately interlocked. Connected to the plate 65 is a split sleeve 67 having a clamping screw 68 by which the sleeve may selectively and respectively loosely and tightly engage one end portion of a stub bar 69 which is of a length to extend beyond the clamping sleeve 67 sufficiently for engagement thereof at its opposite free end portion by a split sleeve 70 which is selectively slidable or tightly clamped upon the stub bar 69 responsive to a clamping bolt and hand clamp 71. Integral with, and offset from, the axis of the split sleeve 70 and axially perpendicular thereto is superposed a second split sleeve member 72 which is selectively loosened and tightened by threaded bolt and hand clamp wheel 73, said sleeve mounting therein one end portion of a handle bar support 74 which integrally mounts the load cell assembly 57 at its opposite end.

Thus the supporting members for the load cell assembly 57 provide a stabilized universality of adjustment of position for the load cell assembly; longitudinally of the measuring arm 56, and stabilized rotatively at any desired angle of arc by rotatable inter-engagement of the plates 62 and 65 and grooves thereof, and transversely by slidability of the handle support 74 of the load cell assembly 57, as well as vertically by adjustment of clamp 70 on bar 69. Yet, by tightening all of the clamps the load cell assembly is stationarily mounted relative to the measuring arm.

While a means for universality of positioning of the load cell assembly is desirable, or even essential as a practical matter in the broad scheme of isometric muscle testing, yet it is to be understood that if it is desired to test only one set of muscles at one position of the patient, the apparatus is operaive by merely clamping the load cell assembly 57 at any stationary position where the tested member of anatomy may be engaged by an adaptor to be described.

The load cell assembly 57 is fixedly, and preferably integrally, secured to the opposite end portion of the load cell handle or bar 74 and comprises a base block 76 (see FIGS. 6 and 7Q, preferably circular in plan and having portions of two diameters providing a circular base plate 77 of larger diameter and an integral cylindrical plunger or piston extension portion 78 of relatively smaller diameter, the base plate 77 mounting a fastening means generally indicated 79 in an inset 80 in the base plate at the face thereof opposite to the pressure piston 78. The fastening means 79 will be further described. The plunger or piston 78 of the base plate provides a piston member which presses against a flexible resilient diaphragm 81 mounted across a fluid pressure chamber such as hydraulic chamber 82 in the load cell assembly. Manifestly the hydraulic chamber 82 has suitable enclosing walls, which preferably comprise an enclosing cover 83 and two annular relatively overlying sidewall pieces 85, 86, which securely mount therebetween the peripheral edge portion of the flexible diaphragm 81 by means of threaded pins 88. The plunger or piston 78 of the base block 76 is spaced from the wall pieces 85, 86 and is secured to the central portion of the diaphragm by means of a headed pin 89 passing axially through the diaphragm 81 and the piston portion 78, the pin having secured engagement to the diaphragm by means of a threaded socket-nut 90 of sufficiently large diameter to provide a satisfactory clamping means of the diaphragm against the adjacent face of the piston portion 78 of the base block 76 to provide a leak-proof connection thereagainst whereby the base block is flexibly and resiliently mounted to oscillate with the flexible diaphragm by reason of a flexible bellows portion 91 of the diaphragm depending in a space between annular housing wall 86 and the piston plunger member 78.

Communicating with one portion of the hydraulic chamber 82 at a fluid-tight connection 92 is a liquid pressure tube 93 which extends to any suitable conventional calibrated registering gauge 94, such as a well-known Bourdon tube type, the gauge having means to register and indicate on a visible dial the pressure exerted upon the diaphragm 81 and liquid in chamber 82, responsive to pressure of the tested member of anatomy upon the diaphragm 81, by means of an adapter to be described.

Since the load cell is stationarily fixed to measuring arm 56, which in a testing operation is braked against movement, it is to be understood that in a testing operation the pressure exerted by a tested body member is effective only against the resilient diaphragm 81. Wherefore, an adapter means generally indicated 95 is provided for engaging the tested body member whereby the pressure exerted by the muscles of the body member may be effective against the diaphragm. For such purpose, it appears manifest that such an adapter may assume various forms to meet the exigencies of varying physical forms of individual body members, only the most convenient forms being illustrated and described herein, with the understanding that in all of such various forms of adapters, they are interchangeably mountable by the fastening means 79 to the stationarily fixed hydraulically responsive load cell so as to exert generated pressure against the diaphragm 81.

The fastening means 79 which connects the adapter to the load cell is mounted in the recess 80 in the base plate 77, a cover plate 96 closing said recess and providing centrally of the plate an opening 97 for receiving therethrough an annularly grooved fastening button hereafter indicated 116. At the inner face of the plate 96 and within the recess 80 there is securely mounted one end of a planar leaf spring plate 98 in such proximity that the head of the button 116 may press firmly thereagainst when mounted in the opening 97.

The fastening means also includes within recess 80 a spring-actuated releasable lock means for holding the button 116 and the adapter 95 in operative relation to the base plate 77 and load cell assembly 57. This releasable lock or fastening means comprises a pair of substantially parallel adjacently spaced arms 100 each pivotally mounted at one of its ends on plate 96 and extending from such mounting toward an edge (termed a forward edge) of said plate 96, each of said arms having a complemental cutout edge portion 101 in the relatively opposed edges to receive therebetween and releasably clamp into a groove 102 of the button 116. Adjacent the forward free end of arms 100 they are under substantial tension toward each other by a coil spring 103. The opposed edges of arms 100 are relatively spaced at said free end sufficiently to provide a slot for mounting therebetween a rotative leverage disc plate 104 which may include radial tongue projections 105 in the plane of said arms, the pivotal pin of said disc extending through the plate 96, and being securely engaged at the opposite face of the plate by a lever handle 106 which extends beyond the periphery of the plate and thus serves as an operating lever which is spring tensioned by the spring 103 and thereby exerts its tension on the lever through tongues 105. Manifestly, operating the handle 106 toward either side will cause the radial tongue projections 105 to spread the arms 100 and thus release the arms from the button-groove 102, whereupon the adapter 95 may be disconnected from the load cell, since the planar spring plate 98 will snap the button 116 out of engagement with the arms 100 when the lever handle 106 and projections 105 spread the arms 100. Thus, an adapter member of any suitable type to engage any part of the anatomy may, by inclusions therein of button 116, be selectively connected to and disconnected from the load cell and its diaphragm and hydraulic chamber.

The adapter device exemplified herein and generally indicated 95 is connected, by the fastening means 79, between the load cell assembly 57 and the member of anatomy which is being tested. For purposes of example there is shown in FIG. 6 an adapter comprising a cuff 110 which may be releasably fastened around the anatomy member, such as the wrist or ankle, by means of a strap and tooth clamp 111 mounted to a pressure block 112, the tested member of anatomy being strapped against an inner face 113 of the pressure block. The opposite face of the pressure block preferably has a central recess 114 for conveniently receiving and for the manual manipulation of lever handle 106 of the fastening means 79, but it is to be noted that the peripheral portion 115 of the pressure block of the adapter has substantially superficial contact with the opposed face of base plate 77 of the load cell assembly so that each movement or oscillation of the adapter by the tested member is reflected as a corresponding movement or oscillation of the piston portion 78 of base plate 76 and thus transmits any such movement to diaphragm 81 and correspondingly registers on the dial 94.

Centrally of the recess 114 in the pressure block 112, the adapter mounts an extended button 116, heretofore mentioned, the button comprising an upstanding stud 117 of sufficient height to pass through the opening 97 in the plate 96, said button having a head 118 which may contact and raise the resilient spring plate 98, and an annular groove 102 being intermediate the head and stud for releasably receiving the edge portions 101 of the spring tensioned arms 100 of the fastening means 79. Thus, any suitable type of adapter provided with a similar button may selectively be connected to the load cell for a similar testing operation of muscles of any appropriate part of the body.

Figure 4:
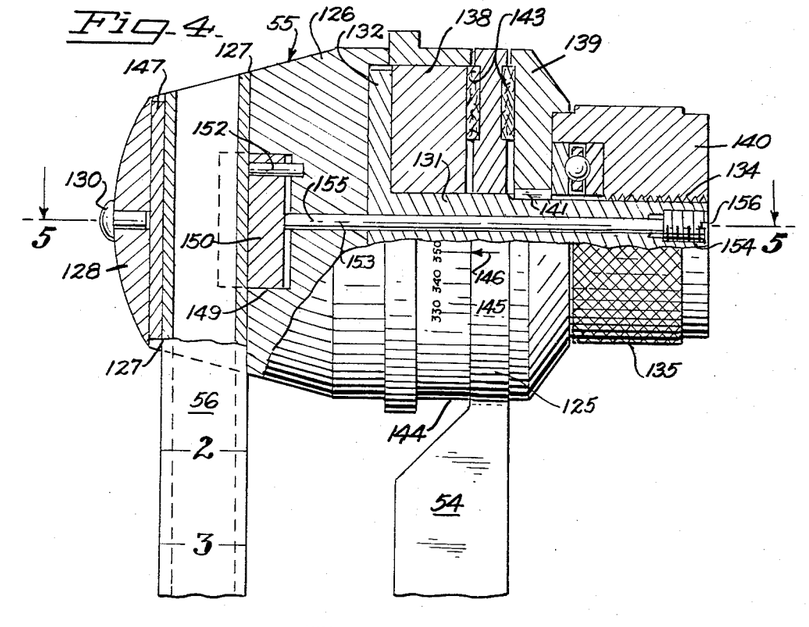
FIG. 4 is an enlarged vertical axially longitudinal side elevation, partly in section, of a hinge brake member.
Figure 5:
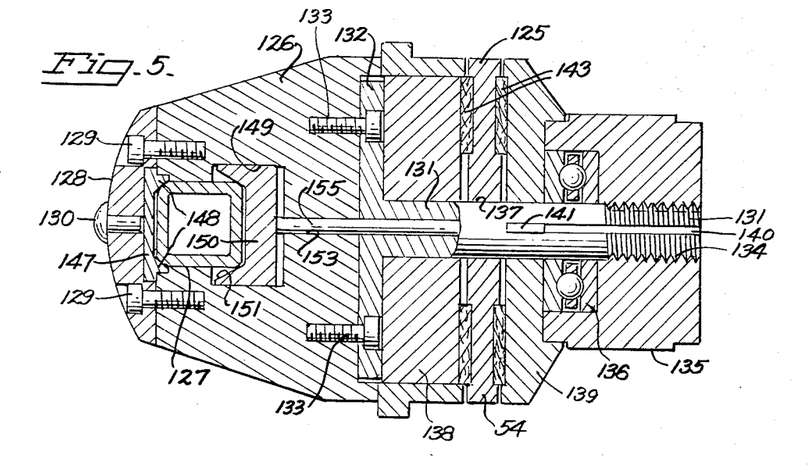
FIG. 5 is an enlarged transverse axial section of brake member on line 5—5 of FIG. 4.

The brake member indicated 55, best shown in FIGS. 4 and 5, is generally axially ellipsoidal and is substantially circular in lateral transverse section. It functions as a hinge, a lock brake, and as a calibrating device for indicating a predetermined amount of angle of the measuring arm 56 relative to positioning arm 54, and the member being tested, with relation to the normal position of that member. For example, in FIG. 1, the angle of the patient's arm is approximately 30 degrees to the normal position of the arm parallel to the general plane of the patient's body and the table. The brake also serves as a means for accurately positioning the measuring arm 56, adapter 95 and load cell 57 in relation to the axis of movement of the joint of the limb or member of anatomy being tested.

The brake 55 is mounted for axial rotation at an end of the adjustable positioning rod 54. Preferably said end of the rod 54 is integrally formed as a circular disc member 125 which is built in as a coaxial component portion of the brake structure. The brake member is constructed of a conical fustrum or truncated foundation block 126 having its axis longitudinally of the brake assembly. This foundation block 126 has a transverse rectangular bore 127 at one end (termed a forward end) for slidably receiving therein an end portion of the measuring arm 56, the slidability being for the purpose of interchange of measuring rods of different lengths, whereby body members of varying lengths may be tested, it being manifest that arm lengths, leg lengths and other body members will be of different lengths between a joint and an extremity of said body member, and more particularly, such members of anatomy of different persons.

At the truncated end of the foundation block there is removably mounted a convex forward end dome cap 128 which may be secured to the truncated end of the foundation block by suitable machine screws 129, the cap having a centering pin 130 at the apex of its convex portion to serve as a centering guide for the axis of the brake structure at the axis of a joint of the patient's tested member. At the other axial end of the foundation block there is a stationary elongated coaxial bearing member 131 fixed to a rear face of the foundation block 126 by a plate 132 and screws 133 therethrough.

The tubular bearing member 131 extends axially to the opposite or outer rear end of the brake member 55 and is externally threaded adjacent said outer end as at 134. Upon the threads 134 there is threadedly mounted an externally knurled hand-grip clamping nut 135 having a ball-race 136 mounted for rotation on the bearing 131. It is to be noted that the circular disc portion 125 of the positioning rod 54 has a central opening 137 mounted on the bearing 131 and has relative rotation thereon. Opposingly disposed at each planar side face of the disc portion 125 of the positioning rod (being that portion of the positioning rod which is incorporated into the brake structure), there are circular disc brake blocks, a forward one being indicated 138, and the rearward one being designated 139, each of which has a central opening for mounting on bearing 131, the block 139 being slidable, but stayed against rotation, on the bearing by a longitudinal key slot 140 cut in the bearing and a complementary key 141 at the central opening of the brake block 139. Between these opposed faces of the respective brake blocks 138, 139 and each of the opposite faces of the disc portion 125 of the positioning rod 54, there are annular planar brake rings 143 of conventional friction brake material. Circumferentially of the brake block 138 is a manually rotatable calibrated annular band 144 which may be manually rotated independent of the brake block 138, the calibrations thereon 145 being matched against any suitably placed indicator mark 146 to indicate the angularity of the measuring rod 56 relative to positioning rod 54, since knowledge of such angularity is desirable to the operator for recording the status of successive muscle tests of the same member.

Means are provided for releasably holding the measuring rod 56 in the bore 127. At one face of the bore 127, inset in a suitable transverse diametral recess in the rear face of the end cap 128, there is a track guide member 147 which has relatively small longitudinal flanges 148 along edges suitable to guide the measuring rod. At the opposite face of the bore 127 there is a transverse lateral rectangular recess 149 formed in the opposed face of foundation block 126 in communication with bore 127. Into this recess 149 there is an axially slidable clamping block 150 which is grooved at a forward face 151 to engage the measuring arm 56, a guide pin 152 maintaining the clamping block in proper alignment. Communicating with the recess 149 is an elongated bore 153 which extends axially through the foundation block 126 and the bearing 131 to an open end at the opposite free end of said bearing including that portion of the bearing which passes through and terminates adjacent to the free end of knurled hand clamp 135, said free end portion of the axial bore 153 being internally threaded as at 154.

In the tube or bore 153 there is a rotatable pressure rod 155, one end of which may bear against the clamping lug 150 and having its opposite end extending to the outer threaded end of the tube 153 and threadedly engaging the threads 154, the outer end of said rod having kerf 156 by which the rod may be rotated to advance or retract it and thus either loosen or tighten the clamping lug 150 and correspondingly selectively clamping and releasing the measuring arm 56 for interchange of the measuring arm or adjustment of its operating length.

Thus, the hinge brake 55 may either tightly or releasably engage the measuring arm 56 by means of clamping block 150 and pressure rod 155, and the measuring arm may be hingedly adjusted to a desired angle relative to positioning rod 54 when the knurled hand-grip clamping nut 135 is loose. This angle may be indicated for record purposes by the calibrations 145 on ring 144 and indicator point 146. After the desired adjustment of angle has been made, the hand-grip nut clamp 135 may be tightened on threads 134 (which does not affect the independently rotatable pressure rod 155), and such tightening of the hand-grip nut 135 draws up the blocks 138 and 139 against the plates of friction brake bands 143 on opposite side faces of disc 125 of the positioning rod 54, which thus locks the rod 54 and measuring arm 56 relatively at a desired predetermined angle.

Figures 10, 11, 15:
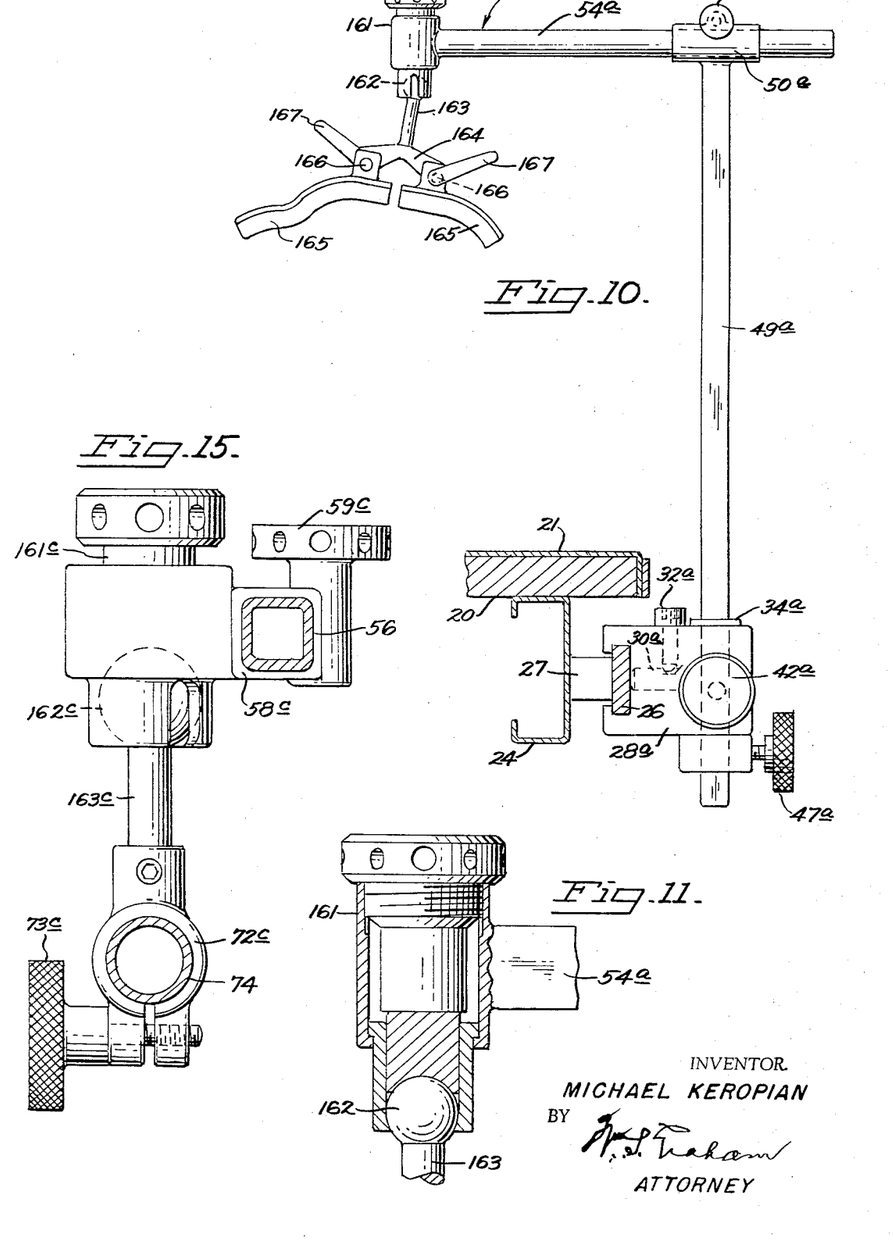
FIG. 10 is an enlarged side elevation of shoulder support structure shown in FIG. 1.
FIG. 11 is an enlarged vertical section of a ball joint clamp shown in FIG. 10.
FIG. 15 is an enlarged plan view of a modified form of mounting means for an adapter and load cell.

Other facilities and appurtenances may be employed as accessories to facilitate the primary purpose of testing muscles. One such accessory is shown in FIG. 10 comprising a shoulder-anchor generally indicated 160 which is highly desirable to stabilize the position of the body of a subject in testing. There may be two such shoulder anchors, one for each shoulder. Such shoulder-anchor means would normally be mounted at the head-end of table 20, each by a slide-block 28a on rail 26.

The slide-block 28a at the head end of the table may have mechanical facilities substantially identical with slide blocks 28 at the side of the table, though they may be changed in shape and size because not being subject to equal stress in operation, thus having a rotatable sleeve 34a, a slide bolt 30a, wedge bolt 32a to clamp rail 26, transverse hand clamp 42a to control rotation of sleeve 34a and hand clamp 47a to control elevation of support rod 49a.

At the upper end of support rod 49a is a tubular T-joint 50a through which extends an extension rod 54a, the length of which may be regulated by a single hand clamp 55a. At the free end of the extension rod 54a, which in operation would be adjacent to the subject's shoulder, there may be any suitable type of threaded plug releasable clamp 161 for a ball joint 162, the ball joint having extension arm 163 terminating at its end in a cross-arm 164 at each end of which is a generally arcuate shoulder-engaging brace 165 which may be separately adjusted to fit forward and rearward contours of the subject's shoulders as by pivotal mounting 166 lockable by levers 167. Similar stabilizing facilities for other parts of the body, such as the hips, may also be employed, and may slide along the rail 25 of the side of the table.

Figures 13, 14:
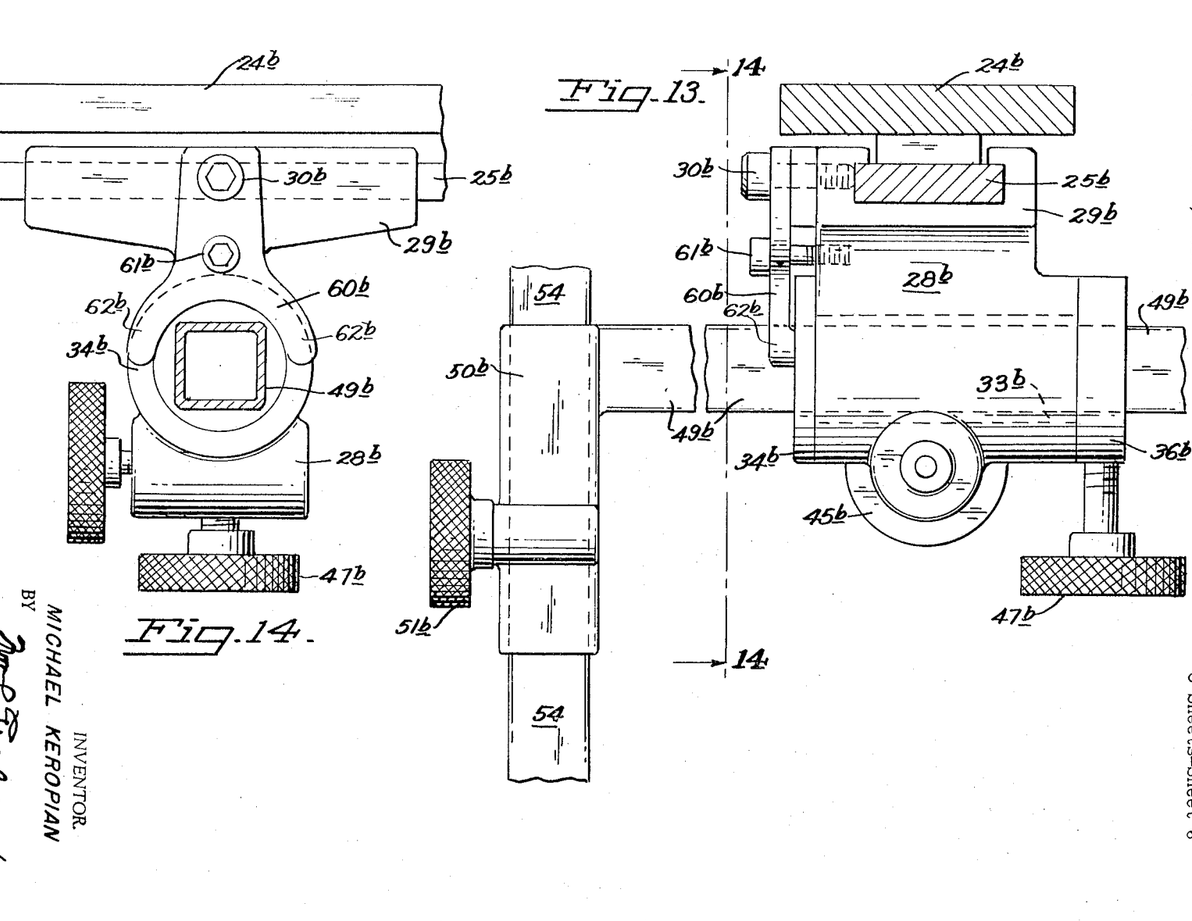
FIG. 13 is an enlarged side elevation, partly in section, of slide block shown in FIG. 12.
FIG. 14 is a fragmentary front elevation of slide block shown on line 14—14 of FIG. 13.

In FIGS. 12, 13 and 14, a modification of operational features of the invention is disclosed generally, in which the invention is especially adapted for testing the leg muscles of a subject, more especially from the knee to the angle in which position it is desirable to have the subject in a supported seated posture at an end of the table 20 with knee joints extended beyond and above the end of the table top 21, and that portion of the leg adjacently above the knee resting on the end portion of the table top, bearing in mind that the physical body measurement of the leg of various subjects will differ.

In this modification the same table 20 and table top 21 may be employed by utilizing the foot end of the table as shown in the broken-away portion of FIG. 12, wherein the runner support 24b of the table and a rail 25b are both under and transversely parallel to the table top, and preferably are inset farther from the edge of the table top than the rails 25 and 26 at the sides and head end of the table, such inset being to accommodate mechanism for testing leg muscles between knee and ankle with the lower portion of the leg depending downwardly, so that the centering pin 130 of the brake 55 may be placed at the axis of pivot of the knee joint.

In this modified form shown in FIGS. 12, 13 and 14, there is a slide-block 28b and sliding shoe 29b which slides along the head of the rail 25b, being lockable against rail 25b in a selective position by a threaded clamping pin 30b to control sliding transversely of the table. The slide block 28b is mechanically generally similar to slide block 28 previously described, including a cylindrical bore 33b rotatably mounting therein a cylindrical tubular sleeve 34b clampable against rotation by hand clamp 45b. At the forward end of slide block 28b there is a yoke member 60b which has one end portion tightly engageable by clamping pin 30b and being further stabilized intermediate its ends by pin 61b threaded into the forward end of the slide block 28b. The opposite end of this yoke member 60b is bifurcated as yoke legs 62b which straddle a support rod 49b and bear loosely against the adjacent end of the tubular sleeve 34b to more securely stabilize the sleeve in the bore 33b, though permitting rotation of said sleeve, subject to the clamps 45b.

The support rod 49b is rectangular in section and is axially slidable through the sleeve 34b parallel to the table top, and may be stationarily clamped at a selective position by hand clamp 47b through annular retaining collar 36b.

At its outer end the support rod 49b perpendicularly mounts a tubular T-joint comprising an integral tubular channel support member 50b which corresponds in mechanical function to the T-member 50 in FIG. 1 in that it supports positioning rod 54, though it is not provided with a rotational sleeve which is believed to be unnecessary at this joint. This tubular channel member 50b may, if desired, also have longitudinally therein spring friction strips similar to strips 35 in FIG. 2, to serve the purpose of maintaining rod 54 against casual sliding, and also as a buffer plate against which a clamp may bear to eliminate scoring of rod 54, though in this modification the clamp 51b of T-channel member 50b clamps at the sidewall of the channel member and not against the rod 54.

By the described structure of FIGS. 12, 13 and 14, the positioning rod 54 may be vertically elevated and lowered, together with the brake 55 which is mounted at the end of the positioning rod 54, the raising and lowering of rod 54 being adapted to position the brake member 55 to accord with the axis of a knee joint of a subject seated on the end of the table, while the inward and outward movement of the support rod 49b may accommodate the position of the brake member inwardly and outwardly as may be necessitated by the position of the knee joint.

This modification of FIGS. 12, 13 and 14 is likewise provided with measuring arm 56, adapter 95, load cell assembly 57, fastening member 79, gauge and hose 93, 94, as well as the bracket means to support the load cell assembly 57, as indicated 58 to 74, inclusive, in FIGS. 8 and 9, all of which are structurally and functionally similar to those same structures previously described.

In FIG. 15, there is disclosed a modified and simplified form of bracket for mounting the load cell assembly 57 and adapter 95 to measuring arm 56, preferably for use where the pressure-stresses on the bracket means may be relatively diminished. Such modified connecting bracket structure of the modification of FIG. 15 includes the measuring arm 56 slidably enclosed in a split sleeve 58c by which the bracket may be releasably clamped stationarily at a selected adjustable position along the length of measuring arm 56 by hand clamp screw 59c, the latter being of similar structure and operation as the previously described hand clamp screw 59 in FIG. 8. Fixed to the sleeve 58c is a socket housing and threaded plug clamp 161c for a ball joint 162c which may be similar to the clamp and ball joint shown in FIG. 11, the ball of said joint having integral arm 163c extending therefrom and providing a universal pivot joint for a split-sleeve clamp 72c fixedly connected by rivet or bolt to the arm 163c, the split sleeve clamp 72c being clampable by hand clamp 73c around the bar support handle 74 which is common to all forms of the invention, the end fixedly supports at its opposite end the load cell assembly 57 and its oscillating adapter 95. Thus by the modification of FIG. 15 the brake 55 and measuring arm 56 may have a simple universal joint connection to the load cell and adapter.

In any of the forms of the invention where appropriate, there may be employed a back support member generally indicated 170 in FIG. 12. The inclusion of such a back support is advantageous in any operation of the invention in which it is desirable that the subject be seated in an upright or partially reclining position such as in the testing of muscles of the lower legs, since, if such a support is not employed, the natural tendency would be to shift the torso of the body rearwardly to compensate the pressure of a tested member, such as the lower leg, against the load cell, and this would give a pressure registration on the gauge 94 which was the sum of muscular action plus the body weight backwardly.

The back support is transversely of the table top and has a slidable mounting bracket having substantially similar operating facilities as the slide block assembly 28 of FIG. 1, though structurally varied, and utilizing the same rail facility 25 longitudinally of the table. The rail 25 of the table is slidably engaged by a slide block 28d which may be stabilized against longitudinal movement along the rail by lever clamp 30d, and including a rotatable cylindrical tubular sleeve 34d in the slide block which may be secured against rotation by hand clamp lever 42d.

Through this rotatable sleeve 34d there is mounted a vertical support rod 49d the elevation of which is controlled by hand clamp 47d. Resilient friction strips not specifically shown, similar to strips 38 in FIG. 2, may likewise be included in this mounting and slide block. The support rod 49d for the back rest has a crossarm at its upper end, a forward extension of which pivotally conndects at 50d with the base of backrest member 51d and the rearward extension thereof having a tubular supporting bracket 52d through which there passes an adjustable supporting rod 53d of the backrest member, the support being adjustable to different positions of the backrest by a hand clamp 54d.

In operation of the invention a subject is placed on the table in a suitable position convenient for testing the muscles of a particular part of the body, for example, in FIG. 1, the muscles from the shoulder to the wrist, and in FIG. 12 the muscles of the legs. One end of measuring arm 56 is clamped in socket 127 of brake 55, and it will be noted that the end 125 of positioning rod 54 is an incorporated part of the brake structure. Therefore, these members 54 and 56 may have hinged movement relatively subject to locking by the handgrip nut 135. In all operations of testing, the center pin 130 of the brake 55 is positioned at the axis of the joint at one end of the member having the muscles to be tested, such position of the brake member being facilitated by the adjustability of the support rod 49 and positioning bar 54. The measuring arm 56 is adjusted to a suitable angle relative to the positioning bar 54 by the rotation of the hinge of brake 55, which may then be locked by handgrip nut 135. The load cell assembly 57 is fixedly secured to the measuring arm 56 and the adapter assembly 95 is secured to the end portion of the anatomy member being tested, the fastening means 79 being interposed between the load cell and adapter, the interchangeable adapter 95 being of suitable type to properly engage such anatomy member. The adapter member being thus interchangeably and releasably connected to the base plate 77, and thereby to the piston plunger portion 78 of the load cell, reflects any movement of the tested member of anatomy upon the diaphragm 81 and hydraulic chamber 82 and this in turn is visibly reflected and indicated on the gauge 94.

It is to be understood that the calibrations 145 on annular band 144 do not measure the muscle capacity. The calibrations are solely for the information of the operator of the apparatus to determine for record purposes, the angle at which tests are being made on a particular subject or patient and at various times.

It may also be noted that the calibrations on the measuring bar 56 indicate to an operator of the apparatus the relative length of the leverage arm of measuring bar 56 at various stages and times of testing.

Basically, the net result of testing is reflected by the gauge 94 responsive to pressure of the tested member through the adapter 95, the load cell 57 and pressure on hydraulic diaphragm 81 responsive to pressure by the adapter on the base block 77 of the load cell assembly.

I claim:

1. A muscle testing apparatus comprising a table support for a subject being tested, a rail track along the table support, a slide-block slidable along the rail, a brake-positioning bar adjustably mounted at one of its end portions relative to said slide-block for selective rotative movement, vertical elevation, and longitudinal movement relative to the support, a hinge-brake mounted at the opposite end of the positioning bar, a measuring arm having one of its end portions adjustably mounted in said hinge brake whereby the positioning bar and the measuring arm may be hingedly connected by said hinge brake, means to lock the brake member against such hinged movement, a load cell including a hydraulic chamber and flexible diaphragm at the opposite end portion of the measuring arm, an adapter for engaging a member of anatomy for a testing operation, means for releasably connecting the adapter to the load cell whereby movement of the adapter may cause pressure against said diaphragm, a lever extending radially outwardly from the adapter whereby the adapter may be released from connection with the load cell, and a hydraulically operable gauge and a conduit connecting the hydraulic chamber with said gauge.

2. In a muscle testing device of the character described, as set forth in claim 1, and including therein a body stabilizing means including a second slide-block slidable along a rail at a side of the table support, a selectively extendable bar support having one of its ends mounted in said second slide-block, said bar support having at its opposite end a pivotally movable clamp member, and a body-engaging bracket adjustably mounted to said pivotal clamp member.

3. A muscle testing apparatus of the character described, as set forth in claim 1, and including a back support member transversely of the table support, said back support member having a second slide-block slidable on the rail of the table support, said slide-block including a rotatable sleeve the axis of which is perpendicular to the table top, a support rod slidable axially of said sleeve, said support rod having one end extendable above the table top and having a pivot connection at said one end, a back-support member having one edge pivotally connected to said one end of the support rod, an adjustable support means for adjusting the incline of the back-support member, said second slide-block including clamp means for selectively controlling rotative movement of said sleeve, vertical elevation of the support rod and longitudinal movement of said second slide-block relative to the rail of the table support.

4. In a muscle testing device of the character described, the combination of a table support and a pressure indicating gauge, rail means mounted on and extending longitudinally of said table support, slide means on said rail means and having a generally upright support means, a positioning bar mounted on said support means for longitudinal movement relative to said table, a measuring arm hingedly connected to one end of said bar for pivotal movement relative thereto whereby said arm is adapted to be arranged adjacent and to generally conform to the position assumed by the member of a person's anatomy being tested, means for locking said arm in position, a load cell means mounted for longitudinal movement on said positioning bar to a position most suitable for the particular member being tested arranged adjacent said arm, said load cell means having a pressure chamber and flexible diaphragm, a fluid conduit between said chamber and said gauge, a body part engaging means associated with said load cell means for attachment to the member being tested whereby movement of the muscles in the member being tested is transmitted to said pressure chamber and to said gauge.

5. In an apparatus for testing muscles according to claim 4, a hinge brake means arranged at the point of pivot between and for hingedly connecting said positioning bar and said measuring arm, said brake means including in its structure a relatively rotatable end portion of a positioning bar, a socket recess for slidably receiving therein an end of a measuring arm, means for securely and releasably fastening said end of the measuring arm in said recess, said positioning bar and said measuring arm radiating coaxially from the hinge axis, and means for locking the positioning bar and the measuring arm against relative hinge movement.

6. In a muscle testing apparatus acording to claim 4, wherein said body engaging means includes an adapter to engage a member of the anatomy to be tested, and releasable fastening means including a spring tensioned lever extending radially outward from the load cell for releasably connecting the adapter to said pressure means whereby movement of the adapter may be reflected against said diaphragm of the hydraulic chamber for registration on said gauge.

7. In a muscle testing device the combination of claim 4 and in which the fastening means between the load cell and the adapter includes an extended button on the adapter having an annular groove, and a pair of arms springbiased towards each other to engage said annular groove, and a lever handle for spreading said arms relatively outwardly for releasing the groove of the button from engagement with the arms of the fastening means.

8. A muscle testing device as set forth in claim 4, and in which there is a rail along the side of the table support, a slide block slidably mounted on the rail, a rotatable tubular sleeve mounted in the slide block, a bar slidable axially in said sleeve and rotatable therewith, said slide block having clamp means for controlling sliding thereof on the rail the axial sliding of the said bar in the rotatable sleeve the rotative movement of the sleeve and the bar therein.

References Cited

UNITED STATES PATENTS

| | | | |
|---|---|---|---|
| 2,498,115 | 2/1950 | Purgett | 128—80 |
| 2,590,055 | 3/1952 | Timmerman | 73—379 |
| 2,708,367 | 5/1955 | Lusk | 73—379 |
| 2,921,790 | 1/1960 | Nawara | 272—79 |
| 3,103,357 | 9/1963 | Berne | 73—379 |
| 3,285,070 | 11/1966 | McDonough | 73—379 |

FOREIGN PATENTS

| | | |
|---|---|---|
| 1,224,172 | 2/1960 | France. |
| 26,809 | Ad. 1898 | Great Britain. |
| 457,018 | 9/1913 | France. |

OTHER REFERENCES

American Sterilizer, Fracture Table Brochure, TC–100R.

Wilkie, D.R.: Force and Velocity in Human Muscle, Journal of Physiology, vol. 110, pp. 270, 1950.

RICHARD C. QUEISSER, *Primary Examiner.*

JAMES GILL, *Examiner.*

JAMES WILLIAMSON, *Assistant Examiner.*